United States Patent [19]
Caron

[11] Patent Number: 5,011,303
[45] Date of Patent: Apr. 30, 1991

[54] INTEGRATED BEARING PROVIDED WITH A PULSER AND WITH A SENSOR FOR EQUIPPING A MOTOR VEHICLE WHEEL HUB

[75] Inventor: Fabrice Caron, Montigny-le-Bretonneux, France

[73] Assignee: SKF France, Clamart Cédex, France

[21] Appl. No.: 542,033

[22] Filed: Jun. 22, 1990

[30] Foreign Application Priority Data

Jul. 4, 1989 [FR] France ................ 89 08984

[51] Int. Cl.$^5$ ............................................. F16C 33/78
[52] U.S. Cl. .................................... 384/448; 384/446
[58] Field of Search ............ 384/448, 446, 484, 486, 384/477

[56] References Cited

U.S. PATENT DOCUMENTS

| | | | |
|---|---|---|---|
| 3,604,966 | 9/1971 | Liggett . | |
| 3,652,886 | 3/1972 | Riordan . | |
| 4,783,180 | 11/1988 | Hayas . | |
| 4,946,296 | 8/1990 | Olschewski et al. | 384/448 |
| 4,968,156 | 11/1990 | Hajzler | 384/448 |

FOREIGN PATENT DOCUMENTS

| | | |
|---|---|---|
| 2111955 | 4/1972 | France . |
| 2558223 | 1/1984 | France . |
| 2570143 | 3/1986 | France . |
| 2574501 | 6/1986 | France . |
| 2599794 | 6/1986 | France . |
| 1509170 | 2/1975 | United Kingdom . |
| 1406739 | 9/1975 | United Kingdom . |
| 1462715 | 1/1977 | United Kingdom . |

*Primary Examiner*—Lenard A. Footland
*Attorney, Agent, or Firm*—Beveridge, DeGrandi & Weilacher

[57] ABSTRACT

Integrated bearing intended particularly for equipping a motor-vehicle wheel hub, comprising a rotary outer ring (1) and a stationary inner ring (2); at least one row of rolling elements (3) arranged between the outer and inner rings; an annular pulser (4) fixed to the rotary ring (1) in the vicinity of one of its ends; and a sensor (5) stationary relative to the stationary ring (2) and located opposite the pulser so as to be capable of measuring the rotational speed of the outer ring in relation to the inner ring of the bearing, characterized in that it comprises a substantially annular flange (6) delimited by an inner cylindrical rim (6a) fixed to the inner ring (2) and by an outer cylindrical rim (6b) which is coaxial relative to the inner rim and on the outside of which is mounted a sensor carrier (7) equipped with means (16) for fastening a connecting cable (8) connected to the sensor, the flange covering without contact the end of the outer ring (1) where the pulser is fastened and being equipped with an orifice (6c), through which the sensor is mounted opposite the pulser.

10 Claims, 7 Drawing Sheets

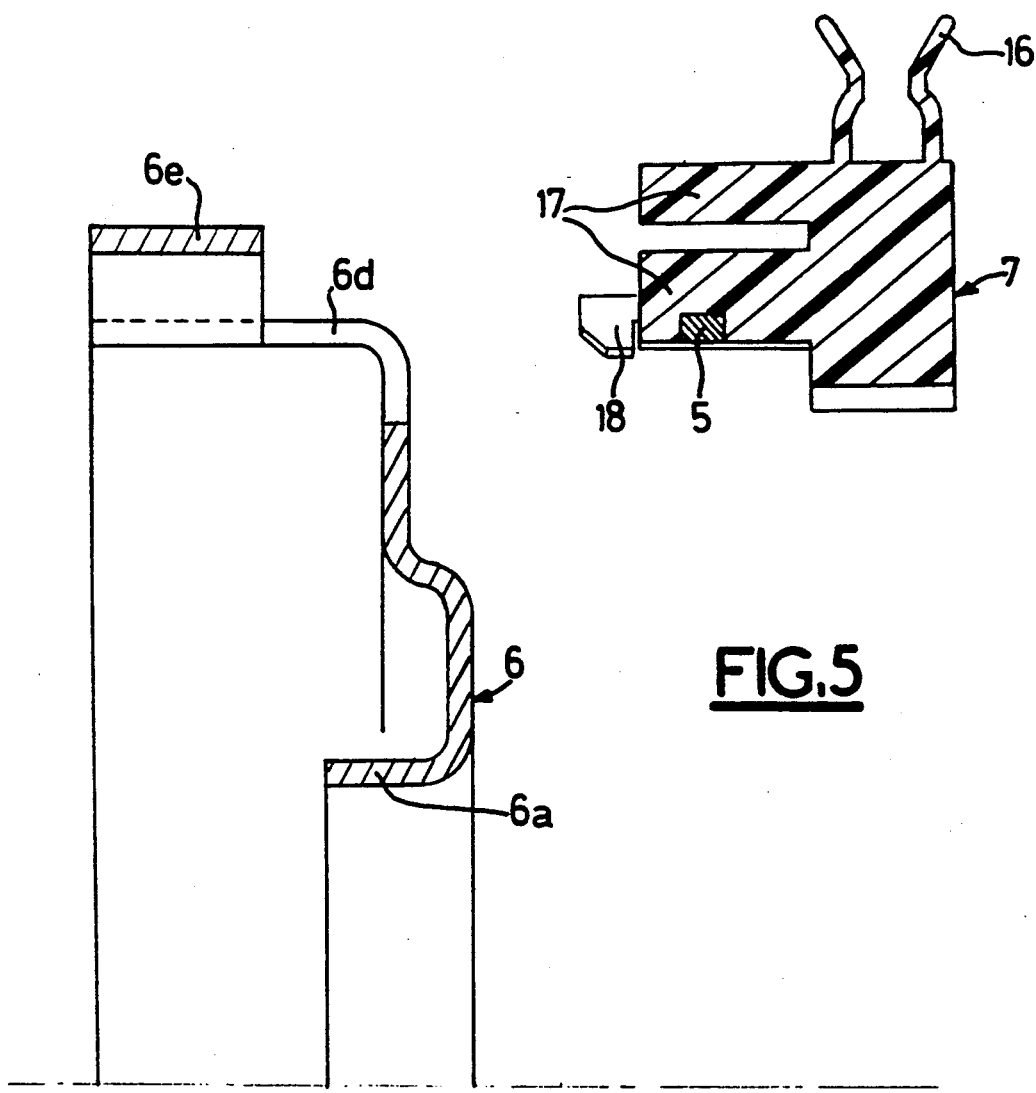
FIG.5
FIG.6
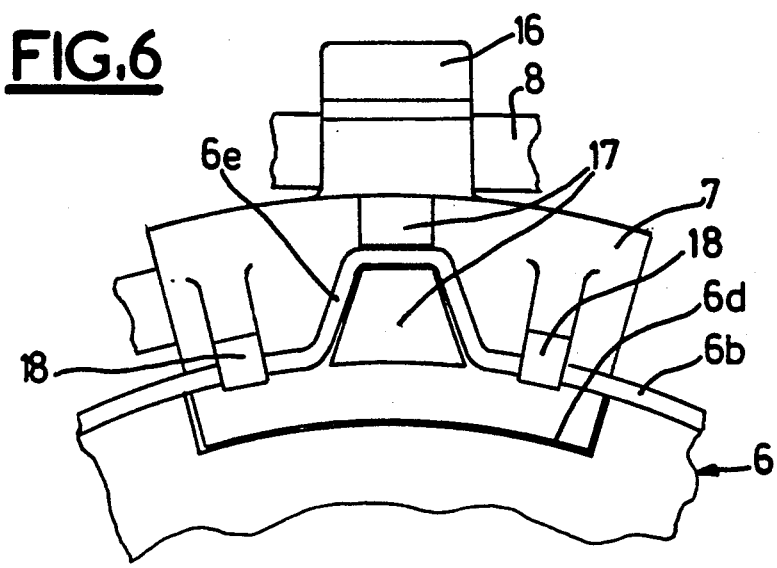

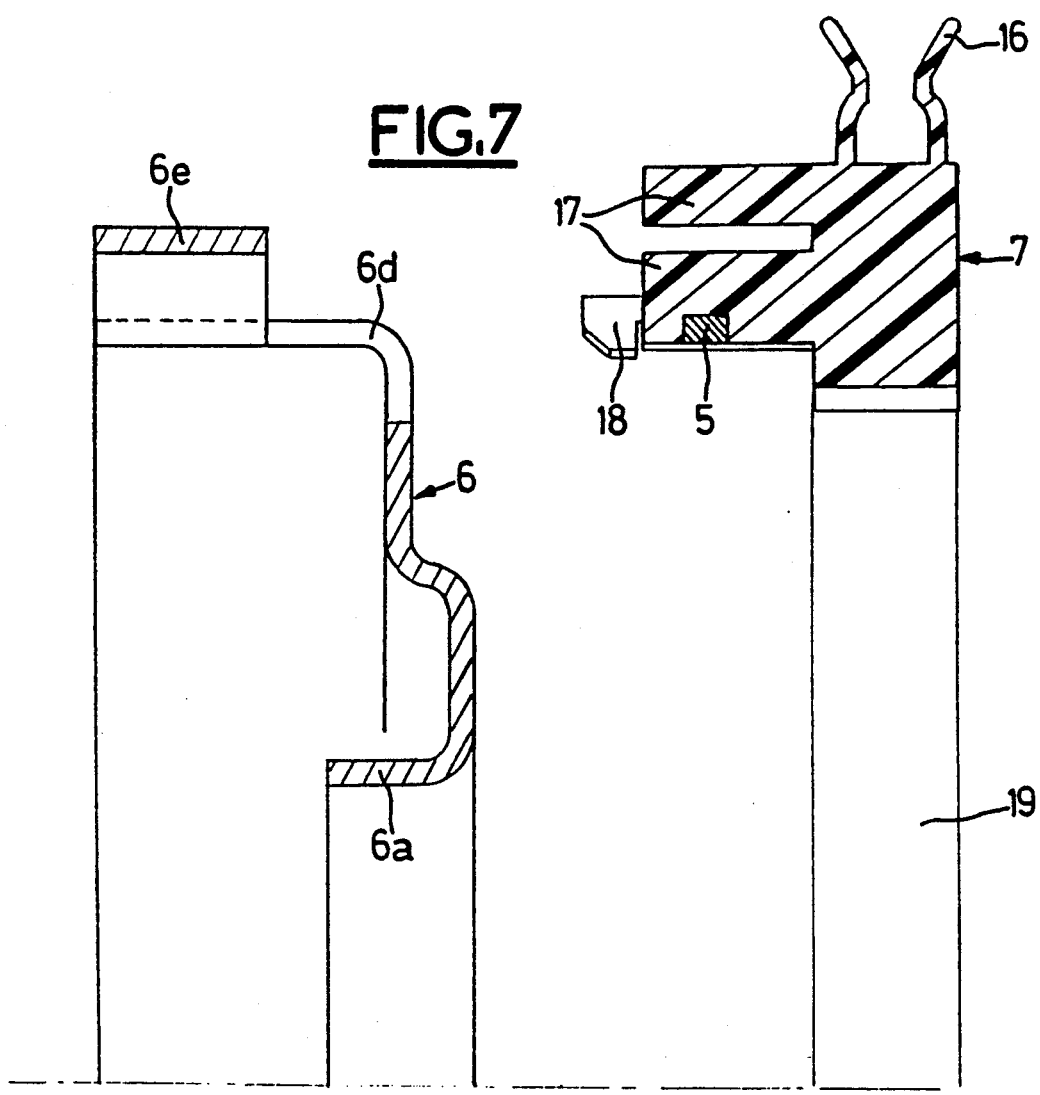
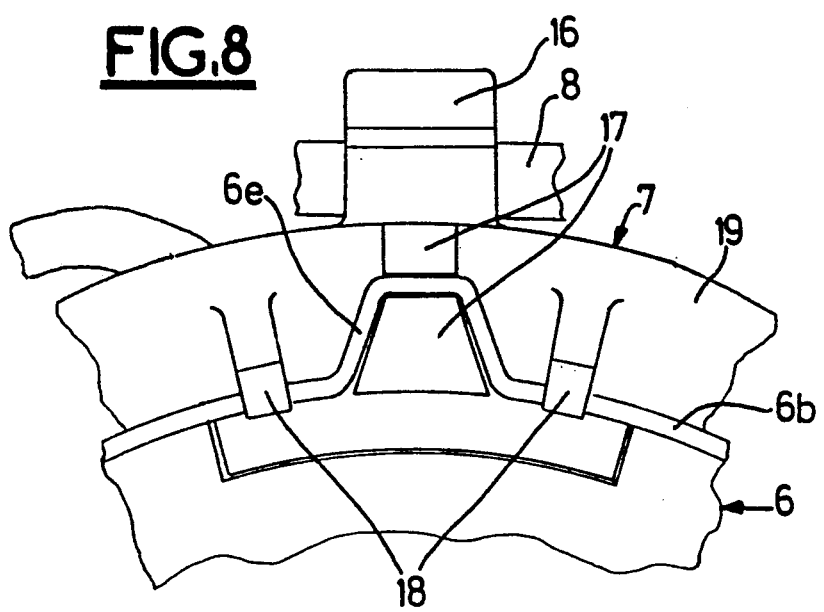

INTEGRATED BEARING PROVIDED WITH A PULSER AND WITH A SENSOR FOR EQUIPPING A MOTOR VEHICLE WHEEL HUB

The present invention relates to an integrated bearing comprising a pulser and a sensor for detecting the rotational speed between an outer ring and an inner ring of the bearing.

The invention relates particularly to an integrated bearing intended for equipping a motor-vehicle wheel hub, the bearing being provided with a pulser and with a sensor for detecting the rotational speed of the wheel and for transmitting the data to an anti-lock system acting on the wheels of the vehicle.

In general, an integrated wheel-hub bearing comprises an outer ring and an inner ring, often in the form of two elements, each of the rings having two races; two rows of rolling elements arranged between the races of the outer and inner rings; one or two cages maintaining a uniform circumferential spacing between the rolling elements; and gaskets preventing the escape of grease from the bearing and contact of the rolling elements with external dirt. The rotating ring of the bearing has a collar, on which the wheel of the vehicle is mounted, and a brake disc or drum. This ring is rotary relative to the other ring which is stationary. The signal measured by the sensor is transmitted to an anti-lock system which itself controls the braking force acting on the relevant wheel in a way well known to a person skilled in the art.

There are known systems for detecting the rotational speed of the rotary ring in relation to the stationary ring of the integrated bearing by using a pulser mounted on the rotary ring and a sensor mounted on a stationary part of the vehicle, such as the stub-holder hub or an attached piece fixed to the said stub-holder hub.

Such systems present practical problems during the mounting and connection of the pulser and sensor, because they are arranged on a plurality of parts of the vehicle and give the pulser and sensor only poor protection against what is variously thrown up, such as water, dirt, etc., which can influence the accuracy and reliability of the measurements.

French Patent No. 7,213,987 provides a system sealed against weather conditions, comprising a sealing device on which a sensor is mounted axially. This system is designed for an integrated bearing of which the inner ring is rotary. However, such a sealing device extends radially, at the same time covering one side of the inner ring completely, the effect of this being to prevent the axial passage of the axle stub through the bearing. Another result of this an axial bulk which can have an adverse effect on the dimensions of the vehicle. Furthermore, no fastening means is provided for the connecting cable connected to the sensor on the one hand and to the wheel anti-lock system on the other hand. As a result, practical difficulties arise during the transport and mounting of the integrated bearing.

French Patent Application No. 8,608,348 likewise makes known another detection system sealed against weather conditions. In this document, a deflector is fastened to the stationary outer ring and supports a sensor passing through it axially. A non-magnetic ring is mounted on the movable inner ring and supports a multipolar magnetic hoop opposite the sensor. The sealing between the deflector and the non-magnetic ring is obtained by means of sealing lips.

Like the conventional systems, this system has a large number of elements to be assembled and is difficult to mount. Furthermore, it likewise has the disadvantage of being bulky in the axial direction and of not solving the problem of fastening the connecting cable.

The object of the present invention is to overcome the disadvantages of conventional systems by providing a compact integrated bearing assembly sealed against what is thrown up from outside and having a high measuring reliability.

Another object of the invention is an integrated motor-vehicle wheel-hub bearing which completely integrates the pulser, the sensor and the fastening of the connecting cable connecting the sensor to the wheel anti-lock system of the motor vehicle.

The integrated bearing according to the invention, intended particularly for equipping a motor-vehicle wheel hub, comprises a rotary outer ring and a stationary inner ring, at least one row of rolling elements arranged between the outer and inner rings, an annular pulser fixed to the rotary ring in the vicinity of one of its ends, and a sensor stationary in relation to the stationary ring and located opposite the pulser so as to be capable of measuring the rotational speed of the outer ring in relation to the inner ring of the bearing.

According to the invention, the integrated bearing comprises, furthermore, a substantially annular flange delimited by an inner cylindrical rim fixed to the inner ring and by an outer cylindrical rim which is coaxial relative to the inner rim and on the outside diameter of which is mounted a sensor carrier equipped with means for fastening a connecting cable connected to the sensor. The flange covers without contact the end of the outer ring where the pulser is fastened. The flange is equipped with an orifice, through which the sensor is mounted opposite the pulser.

According to one embodiment of the invention, the active part of the pulser, which can consist of notches, teeth, corrugations, etc., is arranged radially on the outside diameter of the rotating ring. The orifice of the flange is made in the outer rim which faces the pulser coaxially, in which case the sensor is oriented radially.

According to another embodiment, the active part of the pulser is arranged axially on the end of the rotary ring. The orifice is made in a plane part of the flange located between the inner and outer rims. The sensor is then oriented to face the pulser axially.

The sensor carrier can be mounted on the flange by means of an elastic fastening device interacting with lugs formed on the outer rim of the flange.

Preferably, the sensor carrier is equipped axially with elastic tabs and with at least one centring slideway. In this case, the outer rim of the flange is equipped with at least one lug, in such a way that the centring slideway engages into the lug and the elastic tabs snap onto the free end of the outer rim of the flange for the purpose of mounting the sensor carrier on the flange.

The sensor carrier is advantageously provided with at least one elastic gripper for fastening the connecting cable. The cable can be wound round the periphery of the outer rim of the flange, the free end of the cable having the connecting plug being retained by the elastic gripper of the sensor carrier.

The sensor carrier can have an annular part fastened round the outer rim of the flange and equipped with at least two elastic cable-fastening grippers on the periphery. The annular part of the sensor carrier can incorporate electronic means, for example for the processing of the signal, making it possible to process the measurements of the sensor and supply information to the wheel anti-lock system.

Advantageously, the inner rim of the flange is fitted axially onto the outside diameter of the inner ring on the side of the bearing where the pulser is mounted.

The integrated bearing can have a gasket between the outer and inner rings on the side where the flange is mounted. The sealing lips of the gasket are then in contact with the outside diameter of the inner rim of the flange.

The integrated bearing provided according to the invention has many advantages, the main ones of which are:

safety in terms of packaging and transport to the user's premises, for example to the premises of the motor-vehicle manufacturer, because the assembly formed is compact, the pulser and sensor being protected perfectly from possible shocks. Moreover, the connecting cable and its connecting plug at the free end are kept firmly in position by the elastic grippers of the sensor carrier;

the ease with which the assembly is mounted, for example on a vehicle at the motor-vehicle manufacturer's premises, because there is no unsecured cable which can impede the mounting of the bearing. Moreover, the pulser and the sensor are integrated in the same assembly ready for use. After the bearing has been mounted, it only remains to unclip the connecting cable and connect the cable-connecting plug to the wheel anti-lock system;

operating safety and reliability for the user as a result of a very good protection of the pulser/sensor assembly against what is variously thrown up.

The invention will be understood better from a study of the detailed description of four embodiments of the invention taken as non-limiting examples and illustrated in the accompanying drawings, in which:

FIG. 5 is an exploded partially sectional view of the flange and sensor carrier according to a second embodiment of the invention;

FIG. 6 is a part side view of the flange corresponding to FIG. 5, in the mounted position;

FIG. 7 is an exploded view in axial section of the flange and sensor carrier according to a third embodiment of the invention;

FIG. 8 is a part side view of the flange corresponding to FIG. 7, in the mounted position.

In the rest of the description, identical or equivalent parts of the integrated bearings illustrated in the drawings will bear the same reference numerals.

Figure 1:
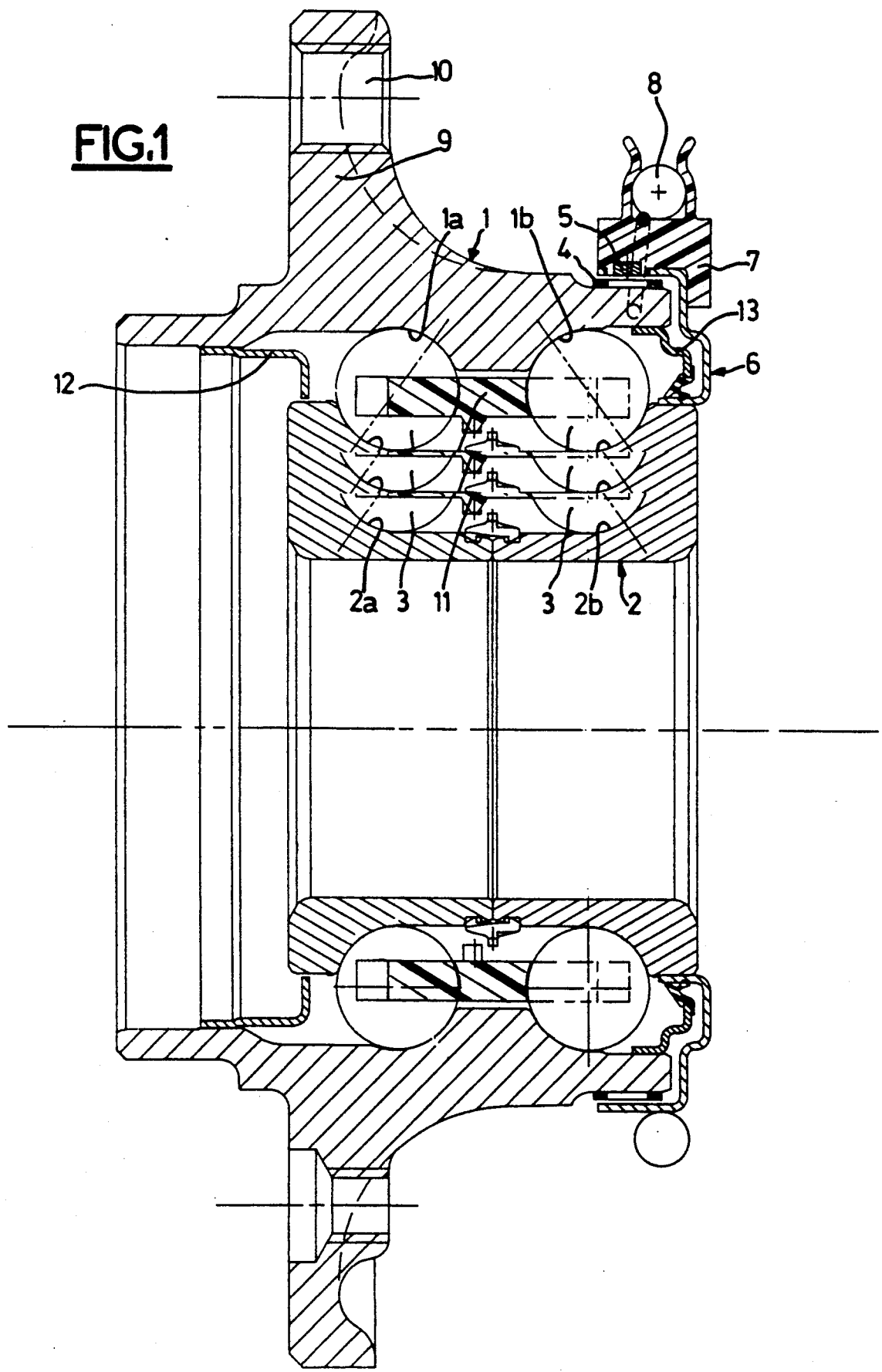
FIG. 1 is a view in axial section of an integrated bearing for a wheel hub according to a first embodiment of the invention.
Figure 2:
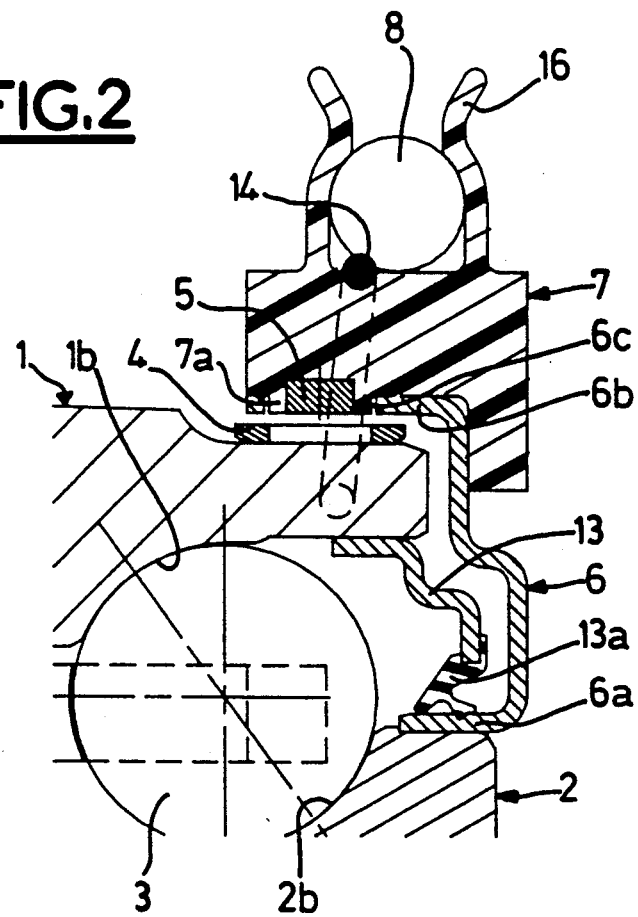
FIG. 2 is an enlarged part view of FIG. 1.
Figure 3:
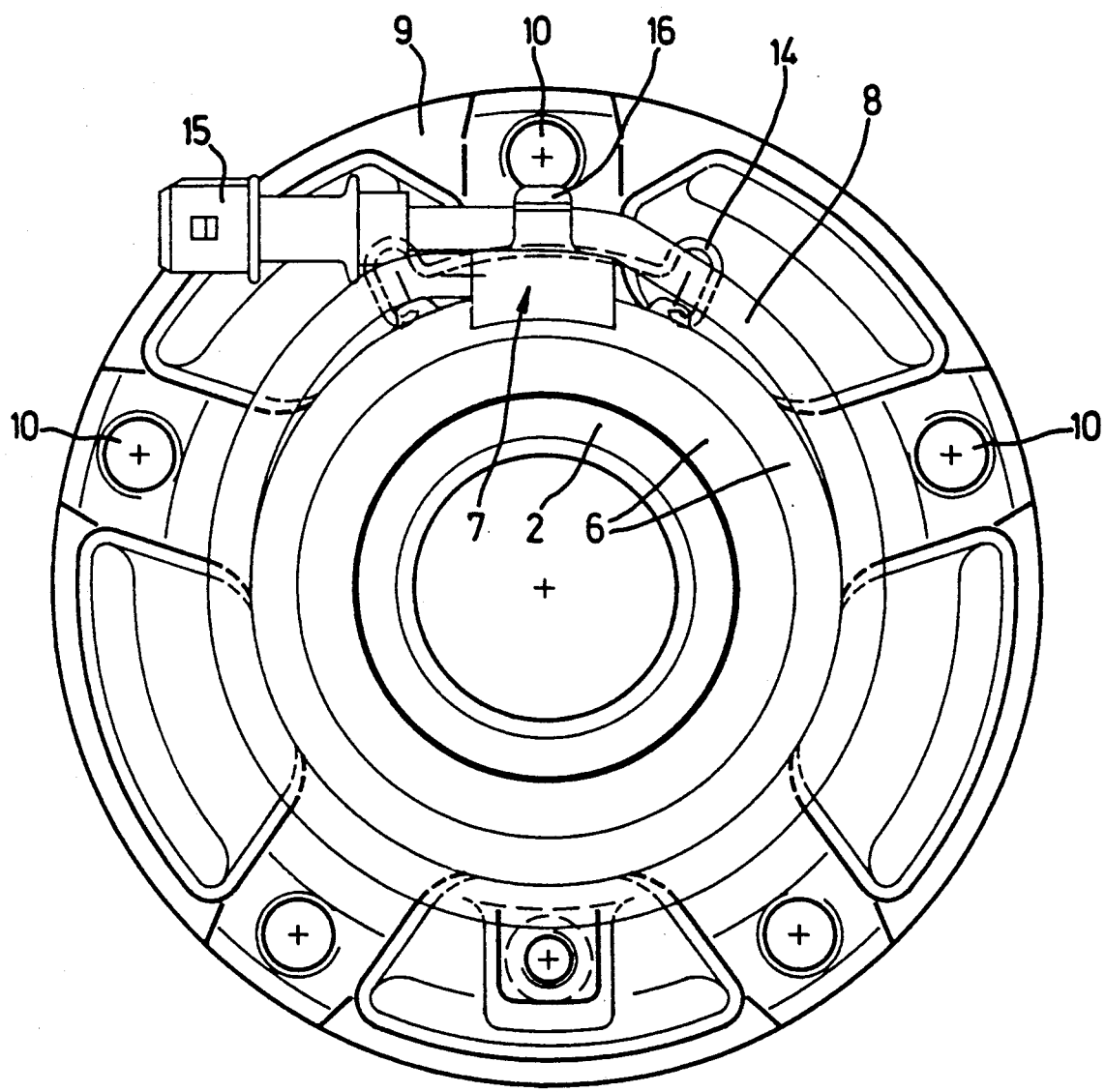
FIG. 3 is a side view of the integrated bearing of FIG. 1.

As illustrated in FIG. 1, the integrated bearing according to the invention for a wheel hub comprises an outer ring 1, an inner ring 2, two rows of rolling balls 3, a pulser 4, a sensor 5, a flange 6, a sensor carrier 7 and a connecting cable 8.

The outer ring 1 is equipped with a collar 9, in which are made axial holes 10, threaded or not, distributed uniformly over the collar 9. Each hole 10 interacts with a bolt or a screw (not shown) for assembling a motor-vehicle wheel and a brake disc (not shown) on the collar 9 of the outer ring 1 on the side on the left in the figure.

Two races 1a and 1b spaced axially from one another are arranged on the inside of the outer ring 1. The pulser 4 in the form of an annulus is mounted on the outside diameter of the ring 1 on the side opposite the collar 9.

The inner ring 2 consists of two parts mounted axially side by side. Each part has on its periphery a race 2a, 2b which interacts with a race 1a, 1b of the outer ring 1 in order to receive a row of rolling balls 3. The circumferential distribution of the rolling balls 3 on the races 1a and 2a, 1b and 2b is ensured by means of a substantially annular cage 11.

The space formed between the outer ring 1 and the inner ring 2 is delimited by a first gasket 12 on the same side as the collar 9 and by a second gasket 13 on the same side as the pulser 4.

The integrated bearing can be mounted on the end of a shaft which fits axially into the inner ring 2. For a motor vehicle, the inner ring 2, stationary in terms of rotation, is fastened on the stub of an axle. The outer ring 1 executes a rotational movement about the inner ring 2 when the wheel fastened to the collar 9 rotates.

Reference is now made to FIGS. 1 to 4 as a whole, in order to explain the first embodiment of the invention in more detail.

The substantially annular flange 6 is delimited by an inner cylindrical rim 6a and an outer cylindrical rim 6b. The inner rim 6a is fastened to the outside diameter of the inner ring 2 at its end opposite the wheel. The inner rim 6a is preferably fitted onto the inner ring 2. The flange 6 covers without contact the corresponding end of the outer ring 1, where the pulser 4 is fastened, and terminates in the outer rim 6b which is coaxial relative to the pulser 4 and opposite the latter and which is equipped with an orifice 6c making it possible to centre the sensor 5 so as to face the pulser 4.

Figure 4:
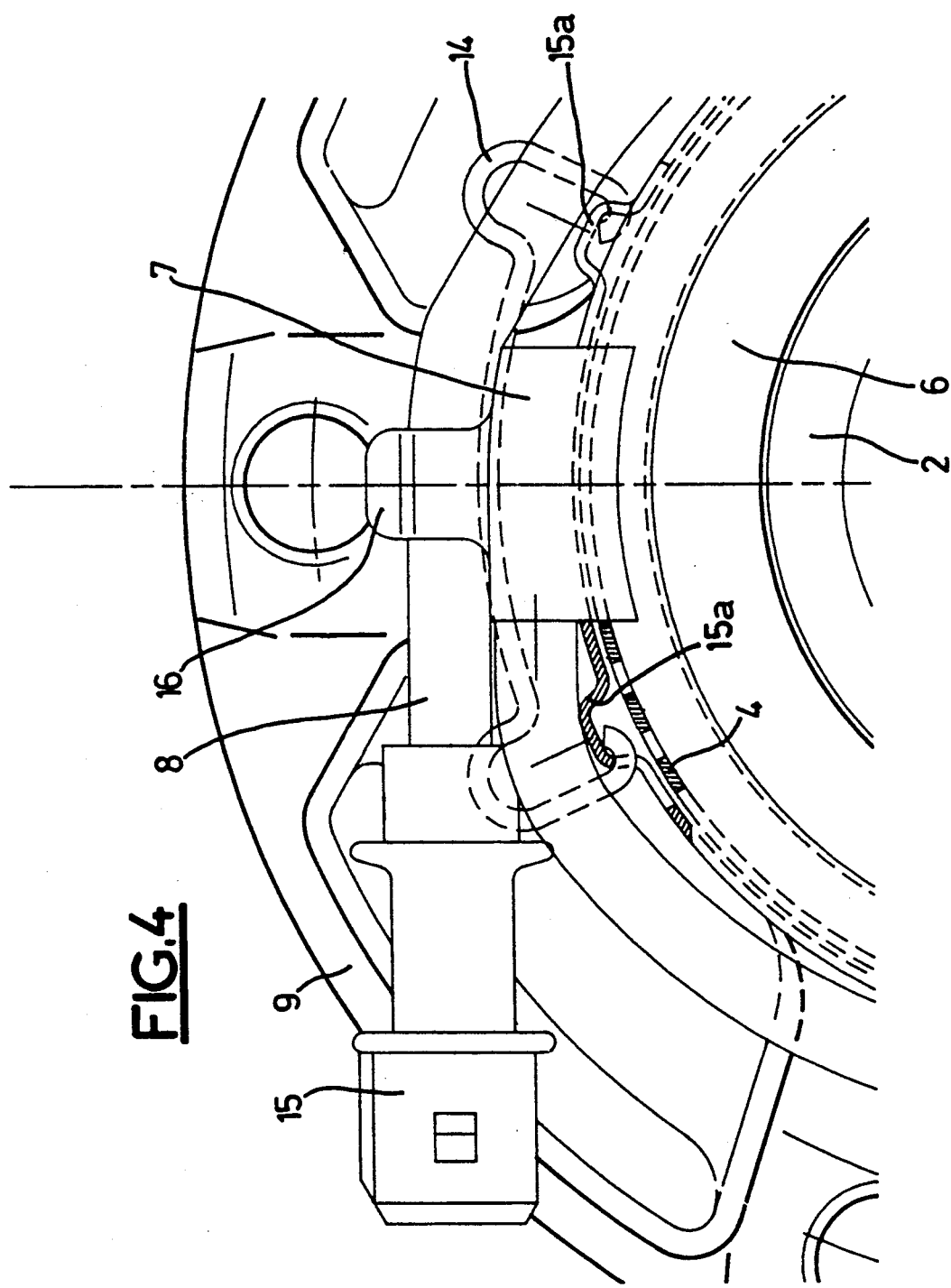
FIG. 4 is an enlarged part view of FIG. 3.

The sensor carrier 7 is fastened to the outside of the outer rim 6b by an elastic fastening means 14 interacting with lugs 15a formed on the outer rim 6b (FIG. 4).

Because the inner ring 2 is stationary, the outer ring 1 being rotary, and the flange 6 is fastened to the inner ring 2 and the pulser 4 to the outer ring 1, the pulser 4 is in rotation relative to the sensor 5 which is stationary.

The pulser 4 can be a ferromagnetic annulus with notches uniformly distributed over its periphery. The sensor 5 can have means for generating a magnetic field. When the pulser 4 executes a rotational movement, it produces a variation of the magnetic field between the sensor 5 and the pulser. The sensor 5 then detects this variation of the magnetic field, the frequency of which is proportional to the rotational speed of the pulser 4 and therefore to the rotational speed of the wheel. A signal is then transmitted by the sensor 5 and conveyed by the connecting cable 8 connected to the sensor 5 as far as a connecting plug 15 at the free end of the connecting cable 8. The connecting plug 15 is connected to a wheel anti-lock system (not shown) which processes the signal received and which itself controls the braking force of the corresponding wheel.

The cable 8, when it comes out of the sensor 5, executes a complete turn round the outer rim 6b of the flange 6 and is fastened in the vicinity of the connecting plug 15 to an elastic gripper 16 forming part of the sensor carrier 7. The sensor carrier 7 possesses, furthermore, a radial protuberance 7a within which the sensor is inserted. The protuberance 7a of the sensor carrier makes it possible to position the sensor 5 in the orifice 6c of the flange 6.

The gasket 13 comprises a sealing lip 13a which bears on the outside diameter of the inner rim 6a of the flange 6.

FIGS. 5 and 6 illustrate a second embodiment of the invention. The flange 6 has an orifice 6d at the outer corner and a positioning lug 6e on the outer edge 6b. The sensor carrier 7 has a centring slideway 17 with an elastic tab 18 on each side.

The construction of the integrated bearing is virtually identical, in this example, to that of the first embodiment. The pulser is likewise oriented radially.

In the assembled position, the centring slideway 17 interacts with the centring lug 6e so as to position the sensor carrier 7 exactly on the flange 6. The orifice 6e makes it possible to assemble the sensor carrier on the flange axially. The two elastic tabs 18 form a hook on the free end of the outer rim 6b of the flange, preventing any axial movement of the sensor carrier 7. The sensor 5 thus positioned is located opposite the pulser 4.

The third embodiment presented in FIGS. 7 and 8 differs from the embodiment of FIGS. 5 and 6 only in respective of the sensor carrier 7. In this embodiment, the sensor carrier 7 has an annular part 19 which, in the mounted position, is arranged round the outer rim 6b of the flange 6. Electronic means making it possible, for example, to process the signal from the sensor can be integrated in this annular part 19. These electronic means can control the braking of the wheel directly or be connected to the anti-lock system. The annular part 19 can be equipped with a particular number of elastic grippers on its periphery for the fastening of the connecting cable 8.

Figure 9:
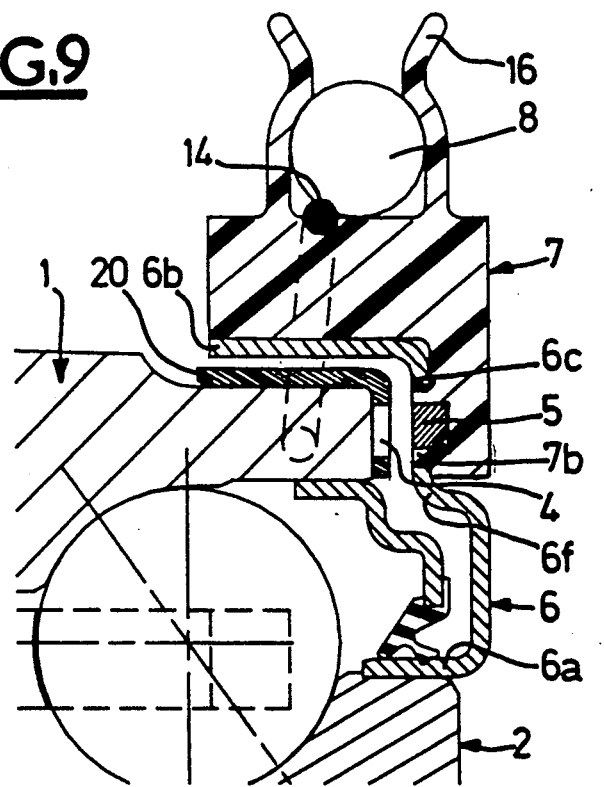
FIG. 9 is a part view in axial section of an integrated bearing according to a fourth embodiment of the invention.

FIG. 9 shows another embodiment of the invention which allows an axial arrangement of the pulser 4 and sensor 5.

This embodiment is virtually identical to the first embodiment illustrated in FIGS. 1 to 4. The pulser 4 comprises an active part arranged axially at the end of the outer ring 1 on the side opposite the wheel. This pulser has a cylindrical fastening rim 20 which is mounted on the outside diameter of the outer ring 1. The sensor 5 inserted within an axial protuberance 7b of the sensor carrier 7 is oriented axially so as to face the pulser 4. In this case, the orifice 6c is made in a plane part 6f located between the inner rim 6a and the outer rim 6b of the flange 6. This orifice 6c allows the sensor 5 to be positioned exactly facing the pulser 4. The sensor carrier 7 is fastened to the flange 6 by an elastic fastening means 14, for example in the form of a metal wire, interacting with lugs of the outer rim 6b of the flange 6.

I claim:

1. Integrated bearing intended for equipping a motor-vehicle wheel hub, comprising a rotary outer ring (1) and a stationary inner ring (2); at least one row of rolling elements (3) arranged between the outer and inner rings; an annular pulser (4) fixed to the rotary ring (1) in the vicinity of one of its ends; and a sensor (5) stationary relative to the stationary ring (2) and located opposite the pulser so as to be capable of measuring the rotational speed of the outer ring in relation to the inner ring of the bearing, characterized in that it comprises a substantially annular flange (6) delimited by an inner cylindrical rim (6a) fixed to the inner ring (2) and by an outer cylindrical rim (6b) which is coaxial relative to the inner rim and on the outside of which is mounted a sensor carrier (7) equipped with means (16) for fastening a connecting cable (8) connected to the sensor, the flange covering without contact the end of the outer ring (1) where the pulser is fastened and being equipped with an orifice (6c), through which the sensor is mounted opposite the pulser.

2. Integrated bearing according to claim 1, characterized in that the active part of the pulser (4) is arranged radially on the outside diameter of the rotary ring (1), and in that the orifice (6c) of the flange is made in the outer rim (6b) which is located coaxially opposite the pulser, the sensor (5) being oriented radially.

3. Integrated bearing according to claim 1, characterized in that the active part of the pulser (4) is arranged axially on the end of the rotary ring (1), and in that the orifice (6c) of the flange is made in a plane part (7b) of the flange located between the inner rim (6a) and outer rim, the sensor (5) being oriented axially so as to face the pulser.

4. Integrated bearing according to any one of claims 1 to 3, characterized in that the sensor carrier (7) is mounted on the flange (6) by means of a fastening means (14) interacting with lugs (15a) formed on the outer rim (6b) of the flange.

5. Integrated bearing according to any one of claims 1 to 3, characterized in that the sensor carrier (7) is equipped axially with elastic tabs (18) and with at least one centring slideway (17), and in that the outer rim (6b) of the flange is equipped with at least one positioning lug (6e), in such a way that the centring slideway engages into the lug and the elastic tabs snap onto the free end of the outer rim for the purpose of mounting the sensor carrier on the flange.

6. Integrated bearing according to any one of claims 1 to 3, characterized in that the sensor carrier (7) is equipped with at least one elastic cable-fastening gripper (16), and in that the connecting cable (8) is wound round the periphery of the outer rim (6b) of the flange (6), the free end of the cable being retained by the elastic gripper of the sensor carrier.

7. Integrated bearing according to any one of claims 1 to 3, characterized in that the sensor carrier (7) has an annular part (19) fastened round the outer rim (6b) of the flange (6) and equipped with at least one elastic cable-fastening gripper on the periphery.

8. Integrated bearing according to claim 7, characterized in that electronic means for processing the signal are integrated in the annular part (19) of the sensor carrier (7).

9. Integrated bearing according to any one of claims 1 to 3, characterized in that it is equipped with a gasket (13) between the outer ring (1) and inner ring (2) at the end where the flange (6) is mounted, the sealing lips (13a) of the gasket being in contact with the outside diameter of the inner rim (6a) of the flange.

10. Integrated bearing according to any one of claims 1 to 3, characterized in that the inner rim (6a) of the flange is fitted axially onto the outside diameter of the inner ring (2).

* * * * *